US012033281B2

(12) United States Patent
Rajasekaran et al.

(10) Patent No.: US 12,033,281 B2
(45) Date of Patent: Jul. 9, 2024

(54) AUTOMATIC BLENDING OF HUMAN FACIAL EXPRESSION AND FULL-BODY POSES FOR DYNAMIC DIGITAL HUMAN MODEL CREATION USING INTEGRATED PHOTO-VIDEO VOLUMETRIC CAPTURE SYSTEM AND MESH-TRACKING

(71) Applicants: SONY GROUP CORPORATION, Tokyo (JP); Sony Corporation of America, New York, NY (US)

(72) Inventors: Suren Deepak Rajasekaran, Milpitas, CA (US); Hiroyuki Takeda, San Jose, CA (US); Kenji Tashiro, San Jose, CA (US)

(73) Assignees: SONY GROUP CORPORATION, Tokyo (JP); Sony Corporation of America, New York, NY (US)

( * ) Notice: Subject to any disclaimer, the term of this patent is extended or adjusted under 35 U.S.C. 154(b) by 154 days.

(21) Appl. No.: 17/706,996

(22) Filed: Mar. 29, 2022

(65) Prior Publication Data
US 2022/0319114 A1 Oct. 6, 2022

Related U.S. Application Data

(60) Provisional application No. 63/169,323, filed on Apr. 1, 2021.

(51) Int. Cl.
*G06T 17/20* (2006.01)
*G06T 7/20* (2017.01)
(Continued)

(52) U.S. Cl.
CPC ............... *G06T 17/20* (2013.01); *G06T 7/20* (2013.01); *G06T 7/30* (2017.01); *G06V 40/10* (2022.01); *G06T 2200/04* (2013.01)

(58) Field of Classification Search
CPC ............ G06T 17/20; G06T 7/20; G06T 7/30; G06T 2200/04; G06V 40/10; G06V 20/20; G06V 20/653; G06V 2201/033
See application file for complete search history.

(56) References Cited

U.S. PATENT DOCUMENTS 7,292,250 B2 * 11/2007 Sepulveda ............... G06T 13/40
345/473
9,191,579 B2 * 11/2015 Seidel .................... H04N 5/262
(Continued)

FOREIGN PATENT DOCUMENTS

| WO | WO2019017985 A1 | 1/2019 |
| WO | 2020132631 A1 | 6/2020 |
| WO | WO2020132631 | 6/2020 |

OTHER PUBLICATIONS

Gerard Pons-Moll, Javier Romero, Naureen Mahmood, and Michael J. Black. 2015. Dyna: a model of dynamic human shape in motion. ACM Trans. Graph. 34, 4, Article 120 (Aug. 2015), 14 pages (Year: 2015).*

(Continued)

*Primary Examiner* — Motilewa Good-Johnson
(74) *Attorney, Agent, or Firm* — Haverstock & Owens, A Law Corporation

(57) ABSTRACT

An integrated photo-video volumetric capture system for 3D/4D scanning acquires 3D scans and 4D scans by acquiring images and videos simultaneously. The volumetric capture system for high-quality 4D scanning and mesh-tracking is used to establish topology correspondences across a 4D scanned mesh sequence for generating corrective shapes which will be used in shape interpolation and skeleton driven deformation. The volumetric capture system aids mesh-tracking for maintaining mesh registration (topology consistency) along with ease of extreme pose modeling. Major upper body and lower body joints are able to be (Continued)

identified that are important for generating deformation and capturing the same using a wide range of motion for all movement types across all joint categories. By using the volumetric capture system and mesh tracking, the topology changes are tracked. Each pose captured will have the same topology which makes blending between multiple poses easier and more accurate.

21 Claims, 12 Drawing Sheets

(51) Int. Cl.
   *G06T 7/30*      (2017.01)
   *G06V 40/10*     (2022.01)

(56)              References Cited

U.S. PATENT DOCUMENTS

| | | | |
|---|---|---|---|
| 9,524,582 B2* | 12/2016 | Ma | G06T 19/00 |
| 9,639,737 B2* | 5/2017 | Beeler | G06V 20/653 |
| 9,892,485 B2* | 2/2018 | Kaytis | G06T 3/40 |
| 10,282,530 B2* | 5/2019 | Gordon | G06T 7/20 |
| 10,529,137 B1* | 1/2020 | Black | G06T 15/04 |
| 11,443,484 B2* | 9/2022 | Vesdapunt | G06T 17/00 |
| 11,640,687 B2* | 5/2023 | Tashiro | G06T 13/40 |
| | | | 345/474 |
| 11,816,795 B2* | 11/2023 | Tashiro | G06T 15/04 |
| 2005/0057569 A1* | 3/2005 | Berger | G06T 13/40 |
| | | | 704/E21.02 |
| 2006/0187297 A1* | 8/2006 | Onural | G03H 1/0005 |
| | | | 348/40 |
| 2008/0069458 A1* | 3/2008 | Vega-Higuera | G06T 15/08 |
| | | | 382/232 |
| 2008/0180448 A1 | 7/2008 | Anguelov et al. | |
| 2009/0284529 A1* | 11/2009 | De Aguiar | G06T 7/251 |
| | | | 345/474 |
| 2010/0278300 A1* | 11/2010 | Yorkston | A61B 6/032 |
| | | | 378/20 |
| 2011/0176715 A1* | 7/2011 | Foos | G06T 11/006 |
| | | | 382/154 |
| 2015/0178988 A1* | 6/2015 | Montserrat Mora | G06T 17/20 |
| | | | 345/420 |
| 2017/0287213 A1* | 10/2017 | Loper | G06T 13/40 |
| 2019/0026942 A1* | 1/2019 | Zhang | G06T 15/205 |
| 2020/0134911 A1* | 4/2020 | van Hoff | G06T 7/292 |
| 2020/0242834 A1* | 7/2020 | Chachek | G06V 40/23 |
| 2020/0312011 A1* | 10/2020 | Kopeinigg | G06T 19/006 |
| 2020/0312037 A1* | 10/2020 | Kopeinigg | G06T 7/70 |
| 2020/0380786 A1* | 12/2020 | Hutsler | G06V 40/20 |
| 2020/0413157 A1* | 12/2020 | Rothschild | H04N 21/21805 |
| 2021/0304478 A1 | 9/2021 | Tashiro et al. | |
| 2022/0005271 A1* | 1/2022 | Chachek | G06F 18/22 |
| 2022/0044478 A1* | 2/2022 | Tashiro | G06T 15/04 |
| 2022/0076493 A1* | 3/2022 | Winston | G06T 11/60 |
| 2022/0087533 A1* | 3/2022 | El-Sallam | A61B 5/7267 |
| 2022/0189119 A1* | 6/2022 | Seo | G06T 7/00 |
| 2022/0207809 A1* | 6/2022 | Comer | G06T 7/73 |
| 2022/0245885 A1* | 8/2022 | Pagés | G06T 7/593 |
| 2023/0101991 A1* | 3/2023 | Anderberg | G06T 19/00 |
| | | | 382/154 |
| 2023/0296595 A1* | 9/2023 | Chou | G01N 33/54386 |
| | | | 435/5 |

OTHER PUBLICATIONS

Schreer et al., Capture and 3D Video Processing of Volumetric Video, pp. 4310-4314, IEEE 2019 (Year: 2019).*

Santesteban, I., Garces, E., Otaduy, M.A. and Casas, D. (2020), SoftSMPL: Data-driven Modeling of Nonlinear Soft-tissue Dynamics for Parametric Humans. Computer Graphics Forum, 39: 65-75. (Year: 2020).*

Federica Bogo et al., "Dynamic Faust: Registering Human Bodies in Motion", Microsoft, Cambridge, UK, Body Labs Inc., New York, NY, MPI for Intelligent Systems, Tubingen, Germany.

Gerard Pons-Moll, "Clothcap: Seamless 4D Clothing Capture and Retargeting", ACM Transactions on Graphics, Vo. 36, No. 4, Article 73. Publication date: Jul. 2017.

"Sparse Localized Deformation Components". Thomas Neumann et al., ACM Transactions on Graphics, vol. 32, No. 6, Article 179, Publication Date: Nov. 2013.

"Capture and Statistical Modeling of Arm-Muscle Deformations", T. Neumann et al., Computer Graphics Forum copyright 2013 The Eurographics Association and Blackwell Publishing, vol. 32 (2013), No. 2.

"SCAPE: Shape Completion and Animation of People", Dragomir Anguelov et al., Copyright 2005 by the Association for Computing Machinery, Inc.

International Search Report and Written Opinion, International Application No. PCT/IB2022/053036, dated Jul. 15, 2022, 15 pages.

* cited by examiner (a) and (b) Angular movements: flexion and extension at the shoulder and knees (c) Angular movements: flexion and extension of the neck (d) Angular movements: flexion and extension of the vertebral column (e) Angular movements: abduction, adduction, and circumduction of the upper limb at the shoulder (f) Rotation of the head, neck, and lower limb

AUTOMATIC BLENDING OF HUMAN FACIAL EXPRESSION AND FULL-BODY POSES FOR DYNAMIC DIGITAL HUMAN MODEL CREATION USING INTEGRATED PHOTO-VIDEO VOLUMETRIC CAPTURE SYSTEM AND MESH-TRACKING

CROSS-REFERENCE TO RELATED APPLICATION(S)

This application claims priority under 35 U.S.C. § 119(e) of the U.S. Provisional Patent Application Ser. No. 63/169,323, filed Apr. 1, 2021 and titled, "AUTOMATIC BLENDING OF HUMAN FACIAL EXPRESSION AND FULL-BODY POSES FOR DYNAMIC DIGITAL HUMAN MODEL CREATION USING INTEGRATED PHOTO-VIDEO VOLUMETRIC CAPTURE SYSTEM AND MESH-TRACKING," which is hereby incorporated by reference in its entirety for all purposes.

FIELD OF THE INVENTION

The present invention relates to three dimensional computer vision and graphics for the entertainment industry. More specifically, the present invention relates to acquiring and processing three dimensional computer vision and graphics for film, TV, music and game content creation.

BACKGROUND OF THE INVENTION

Virtual human creation is highly manual, time-consuming and expensive. Rather than hand-crafting Computer Graphics (CG) artwork from scratch, the recent trend is to efficiently create realistic digital human model by multi-view camera 3D/4D scanners. Various 3D scanner studios (3Lateral, Avatta, TEN24, Pixel Light Effect, Eisko) and 4D scanner studio (4DViews, Microsoft, 8i, DGene) exist world-wide for camera captured based human digitization.

A photo-based 3D scanner studio includes multiple array of high resolution photography cameras. The prior art of 3D scan typically is used to create rigged modeling and requires hand-crafting for animation as it does not capture deformation. A video based 4D scanner (4D=3D+time) studio includes multiple arrays of high frame rate machine vision cameras. It captures natural surface dynamics, but due to fixed videos and actions, it cannot create novel face expression or body action. Dummy actors need to perform many sequences of actions, meaning a huge workload for the actor.

SUMMARY OF THE INVENTION

An integrated photo-video volumetric capture system for 3D/4D scanning acquires 3D scans and 4D scans by acquiring images and videos simultaneously. The volumetric capture system for high-quality 4D scanning and mesh-tracking is used to establish topology correspondences across a 4D scanned mesh sequence for generating corrective shapes which will be used in shape interpolation and skeleton driven deformation. The volumetric capture system aids mesh-tracking for maintaining mesh registration (topology consistency) along with ease of extreme pose modeling. Major upper body and lower body joints are able to be identified that are important for generating deformation and capturing the same using a wide range of motion for all movement types across all joint categories. By using the volumetric capture system and mesh tracking, the topology changes are tracked. Each pose captured will have the same topology which makes blending between multiple poses easier and more accurate.

In one aspect, a method programmed in a non-transitory of a device comprises using a volumetric capture system configured for 3D scanning and 4D scanning including capturing photos and video simultaneously, wherein the 3D scanning and 4D scanning includes detecting muscle deformation of an actor and implementing mesh generation based on the 3D scanning and 4D scanning. The 3D scanning and 4D scanning include: 3D scans to be used to generate automatic high-fidelity extreme poses and 4D scans which include high temporal resolution which enables mesh tracking to automatically register extreme pose meshes for blending. Generating automatic high-fidelity extreme poses includes using 3D scans of the actor and muscle deformation of the actor to generate the automatic high-fidelity extreme poses. 4D scanning and mesh-tracking are used to establish topology correspondences across a 4D scanned mesh sequence for generating corrective shapes for shape interpolation and skeleton driven deformation. The method further comprises identifying and targeting joints and muscles of the actor by the volumetric capture system for 3D scanning and 4D scanning Mesh generation includes muscle estimation or projection based on the 3D scanning and 4D scanning and machine learning. Implementing mesh generation includes using the 3D scanning and 4D scanning to generate meshes in extreme poses including muscle deformation. The method further comprises implementing mesh tracking for tracking topology changes to enable each pose captured to have a same topology for blending between poses.

In another aspect, an apparatus comprises a non-transitory memory for storing an application, the application for: using a volumetric capture system configured for 3D scanning and 4D scanning including capturing photos and video simultaneously, wherein the 3D scanning and 4D scanning includes detecting muscle deformation of an actor and implementing mesh generation based on the 3D scanning and 4D scanning and a processor coupled to the memory, the processor configured for processing the application. The 3D scanning and 4D scanning include: 3D scans to be used to generate automatic high-fidelity extreme poses and 4D scans which include high temporal resolution which enables mesh tracking to automatically register extreme pose meshes for blending. Generating automatic high-fidelity extreme poses includes using 3D scans of the actor and muscle deformation of the actor to generate the automatic high-fidelity extreme poses. 4D scanning and mesh-tracking are used to establish topology correspondences across a 4D scanned mesh sequence for generating corrective shapes for shape interpolation and skeleton driven deformation. The application is further configured for identifying and targeting joints and muscles of the actor by the volumetric capture system for 3D scanning and 4D scanning Mesh generation includes muscle estimation or projection based on the 3D scanning and 4D scanning and machine learning. Implementing mesh generation includes using the 3D scanning and 4D scanning to generate meshes in extreme poses including muscle deformation. The application is further configured for implementing mesh tracking for tracking topology changes to enable each pose captured to have a same topology for blending between poses.

In another aspect, a system comprises a volumetric capture system for 3D and 4D scanning including capturing photos and video simultaneously, wherein the 3D scanning and 4D scanning includes detecting muscle deformation of an actor and a computing device configured for: receiving the captured photos and video from the volumetric capture system and implementing mesh generation based on the 3D scanning and 4D scanning. The 3D scanning and 4D scanning include: 3D scans to be used to generate automatic high-fidelity extreme poses and 4D scans which include high temporal resolution which enables mesh tracking to automatically register extreme pose meshes for blending. Generating automatic high-fidelity extreme poses includes using 3D scans of the actor and muscle deformation of the actor to generate the automatic high-fidelity extreme poses. 4D scanning and mesh-tracking are used to establish topology correspondences across a 4D scanned mesh sequence for generating corrective shapes for shape interpolation and skeleton driven deformation. The volumetric capture system is further configured for identifying and targeting joints and muscles of the actor by the volumetric capture system for 3D scanning and 4D scanning Mesh generation includes muscle estimation or projection based on the 3D scanning and 4D scanning and machine learning. Implementing mesh generation includes using the 3D scanning and 4D scanning to generate meshes in extreme poses including muscle deformation. The volumetric capture system is further configured for implementing mesh tracking for tracking topology changes to enable each pose captured to have a same topology for blending between poses.

DETAILED DESCRIPTION OF THE PREFERRED EMBODIMENT

An automatic blending system utilizes an integrated photo-video volumetric capture system for 3D/4D scanning acquires 3D scans and 4D scans by acquiring images and videos simultaneously. The 3D scans are able to be used to generate auto high-fidelity extreme poses, and the 4D scans include high temporal resolution which enables mesh tracking to automatically register extreme pose meshes for blending.

A volumetric capture system (photo-video based) for high-quality 4D scanning and mesh-tracking is able to be used to establish topology correspondences across a 4D scanned mesh sequence for generating corrective shapes which will be used in shape interpolation and skeleton driven deformation. The photo-video system aids mesh-tracking for maintaining mesh registration (topology consistency) along with ease of extreme pose modeling unlike hand-crafted shape modeling which aids registration but has manual shape generation and the 3D scanning-based approach which aids shape generation but not registration.

The approach described herein is based on photo-video capture from a "photo-video volumetric capture system." Photo-video based capture is described in PCT Patent Application PCT/US2019/068151, filed Dec. 20, 2019 titled, PHOTO-VIDEO BASED SPATIAL-TEMPORAL VOLUMETRIC CAPTURE SYSTEM FOR DYNAMIC 4D HUMAN FACE AND BODY DIGITIZATION, which is hereby incorporated by reference in its entirety for all purposes. As described, the photo-video capture system is able to capture high fidelity texture in sparse time, and between the photo captures, video is captured, and the video is able to be used to establish the correspondence (e.g., transition) between the sparse photos. The correspondence information is able to be used to implement mesh tracking.

Major upper body and lower body joints are able to be identified that are important for generating deformation and capturing the same using a wide range of motion for all movement types across all joint categories. The joints are able to be used in muscle deformation. For example, by knowing how a joint moves and how a muscle near a joint deforms, the skeleton/joint information is able to be used for muscle deformation which is able to be used for mesh generation. Furthering the example, the images and videos acquired are also able to be used by having a video of muscle deformation, the mesh of the muscle deformation is able to be more accurately generated.

By using the photo-video system and mesh tracking, the topology changes are able to be tracked. Thus, each pose captured will have the same topology which makes blending between multiple poses easier and more accurate.

Figure 1:
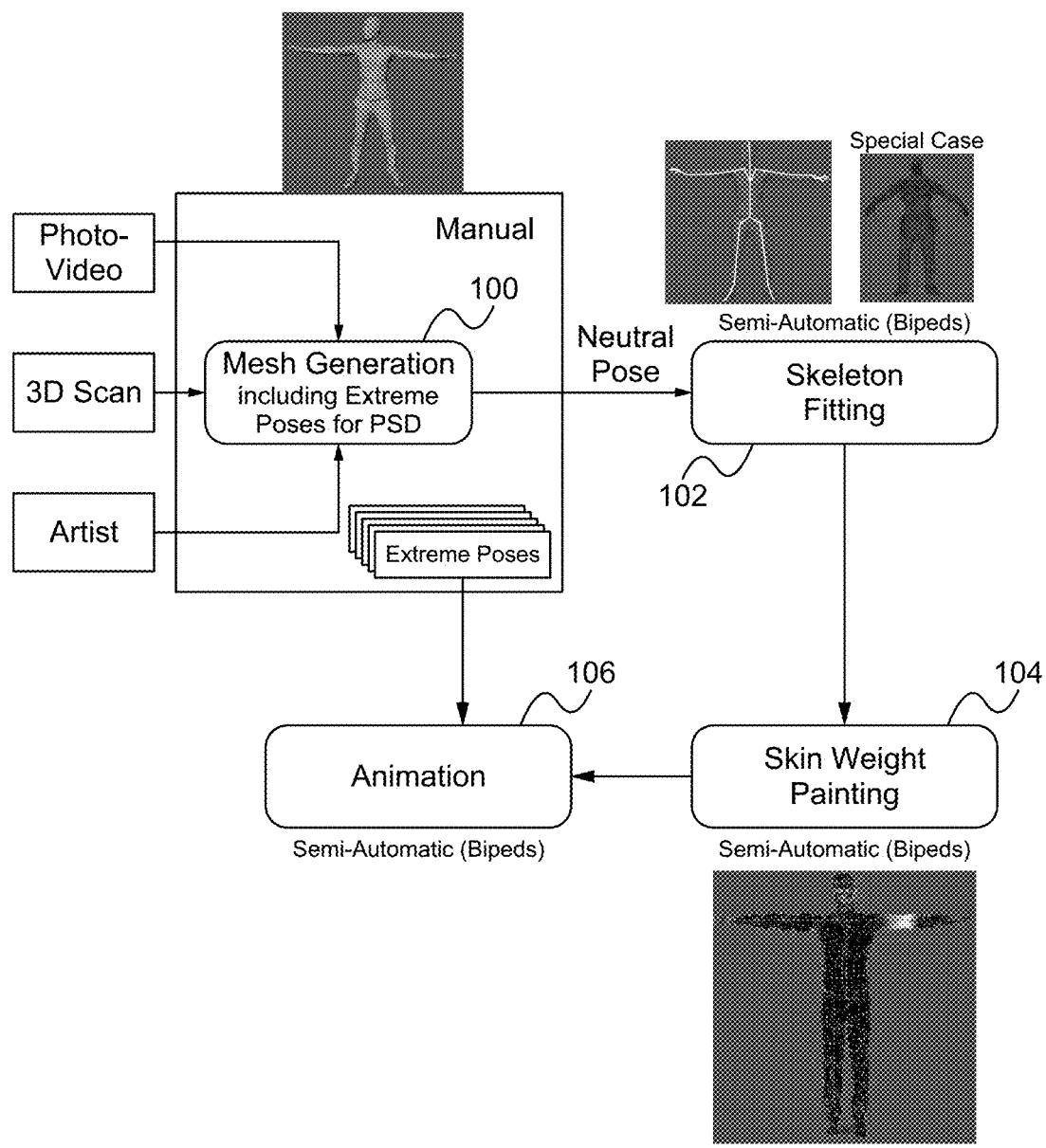
FIG. 1 illustrates a flowchart of a method of animating a subject using a photo-video volumetric capture system according to some embodiments.

FIG. 1 illustrates a flowchart of a method of animating a subject using a photo-video volumetric capture system according to some embodiments. In the step 100, mesh creation/generation is implemented using the integrated volumetric photo-video system. The mesh generation includes extreme pose modeling and registration for blending. As described, the integrated photo-video volumetric capture system for 3D/4D scan acquires 3D scans and 4D scans by acquiring images and videos of a subject/actor simultaneously. The 3D scans are able to be used to generate auto high-fidelity extreme poses, and the 4D scans include high temporal resolution which enables mesh tracking to automatically register extreme pose meshes for blending. In the step 102, skeleton fitting is implemented. Skeleton fitting is able to be implemented in any manner such as based on relative marker trajectories. In the step 104, skin weight painting is performed. Skin weight painting is able to be implemented in any manner such as determining the weight of each segment of skin and painting accordingly. In the step 104, animation is performed. Animation is able to be performed in any manner. Depending on the implementation, each of the steps is able to be performed manually, semi-automatically or automatically. In some embodiments, fewer or additional steps are implemented. In some embodiments, the order of the steps is modified.

Figure 2:
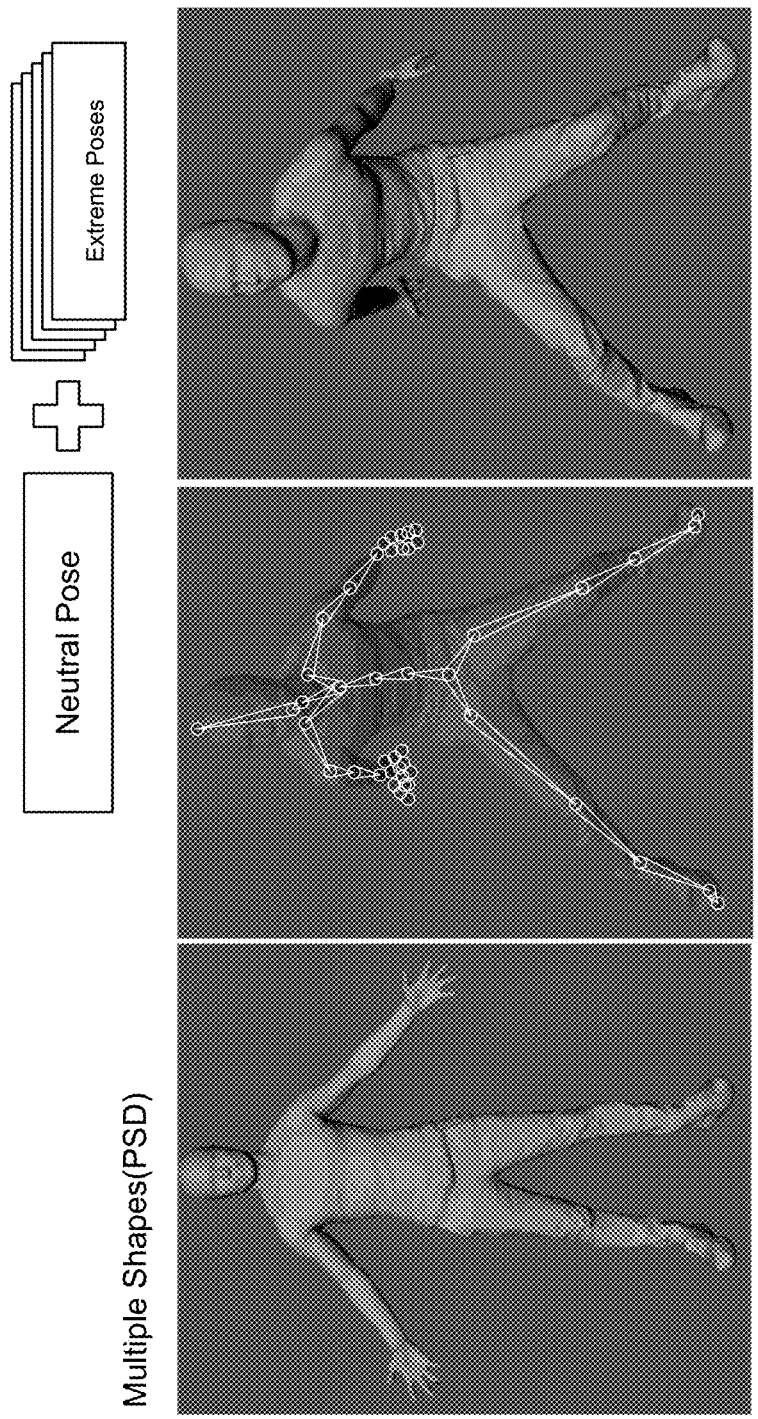
FIG. 2 illustrates a diagram of a mesh generated by combining a neutral pose and extreme poses according to some embodiments.
Figure 2:

FIG. 2 illustrates a diagram of a mesh generated by combining a neutral pose and extreme poses according to some embodiments. A neutral pose is able to be any standard pose such as standing with arms down, arms up or arms out to the side. Extreme poses are the poses between standard poses such as when a subject moves between standard poses. Extreme poses are captured by targeting specific parts of the human muscle, which enables generation of the extreme shape for the game development pipeline. The photo-video system and mesh tracking are able to be used to target all muscle groups of the human body to capture and solve the problem of maintaining a mesh registration in the graphics game development pipeline.

When developing a new video game, a model is captured for the game. An actor typically comes in to a studio one time to be recorded performing specified movements and/or actions. The studio comprehensively captures all of the actor's muscle deformations using the photo-video volumetric capture system. Moreover, by using existing kinesiology movements and types of deformation that occur in the human body, a corresponding mesh is able to have similar deformations. Using a previously captured neutral poses and additional captured poses, a system is able to deform the model to be similar to human movements/deformations. Additionally, the kinesiology movements, deformations and/or other knowledge and data are able to be used in training the system.

Figure 3:
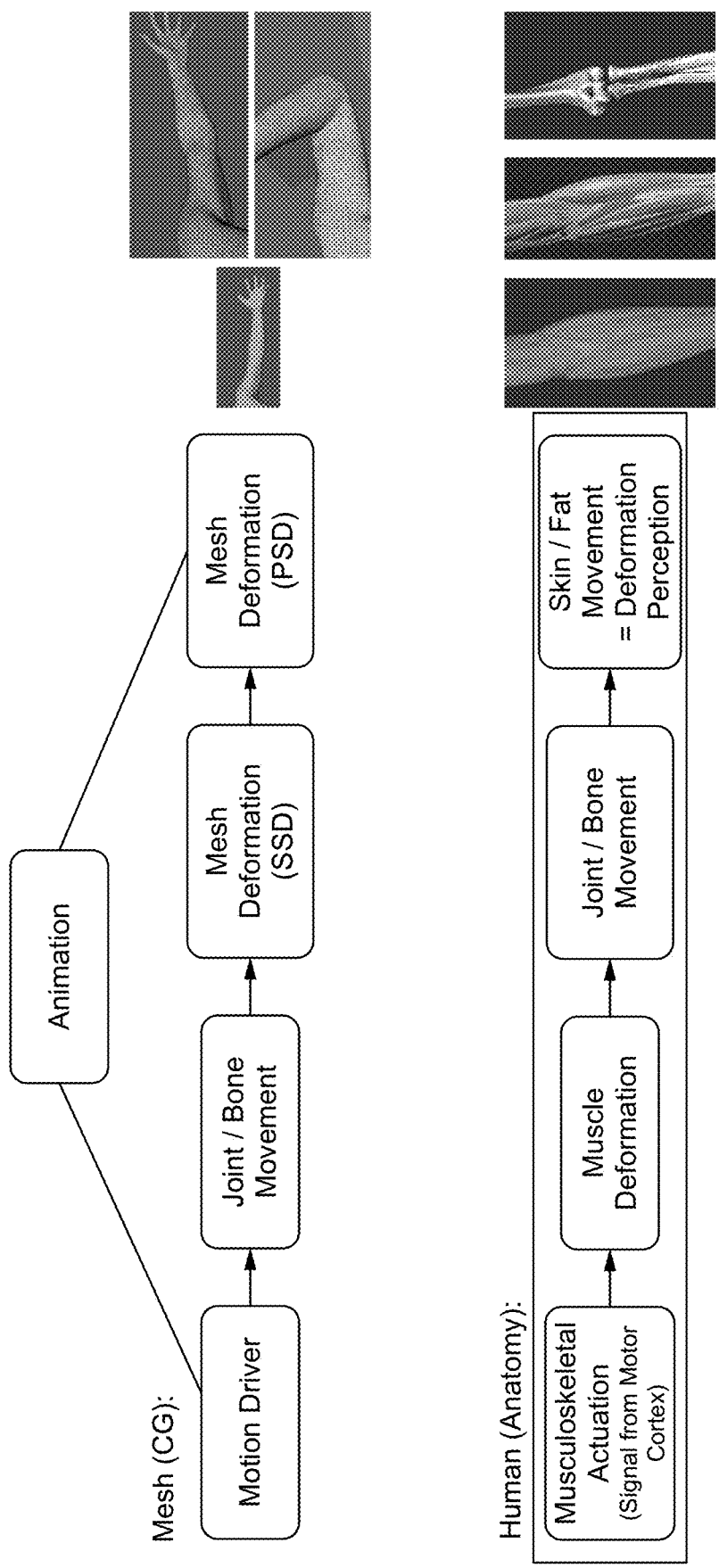
FIG. 3 illustrates a diagram of the correlation between human anatomy verus computer graphics according to some embodiments.

FIG. 3 illustrates a diagram of the correlation between human anatomy verus computer graphics according to some embodiments. In human anatomy, musculoskeletal actuation involves receiving a signal from a person's motor cortex. Then, muscle deformation occurs which enables joint/bone movement by the muscle pulling on the bone. Additionally, there is skin/fat movement. In a computer graphics mesh, a motion driver triggers movement in an animated character, specifically by performing joint/bone movement. Mesh deformation (Skeletal Subspace Deformation (SSD)) then occurs, followed by mesh deformation (Pose Space Deformation (PSD)). A clear correlation is able to be seen between human anatomy and a mesh generated using computer graphics.

Figure 4A:
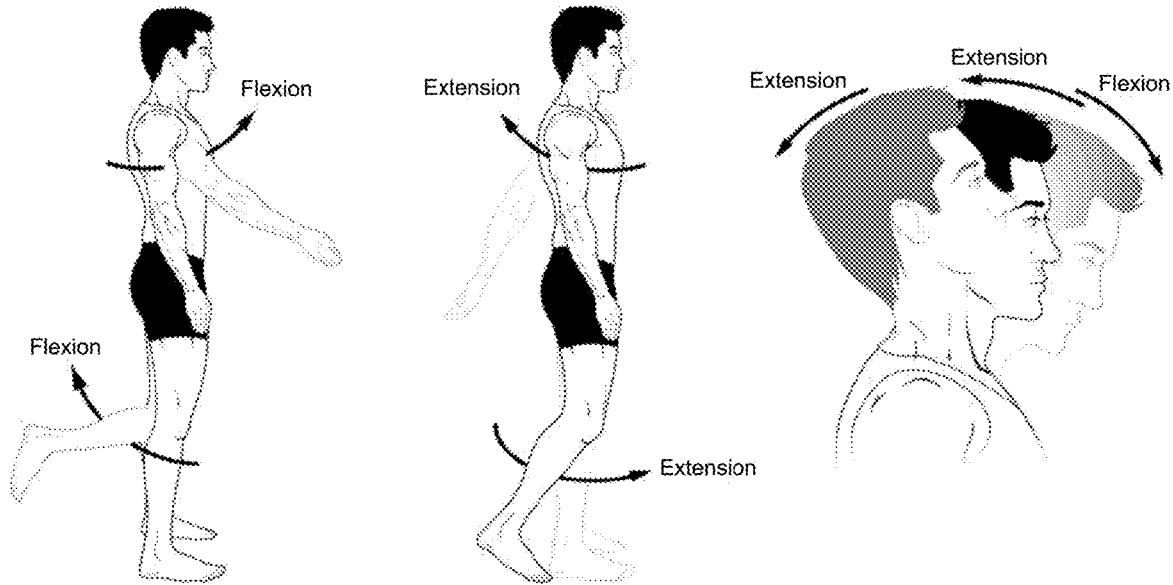
FIGS. 4A-B illustrate diagrams of muscle movements according to some embodiments.
Figure 4A:
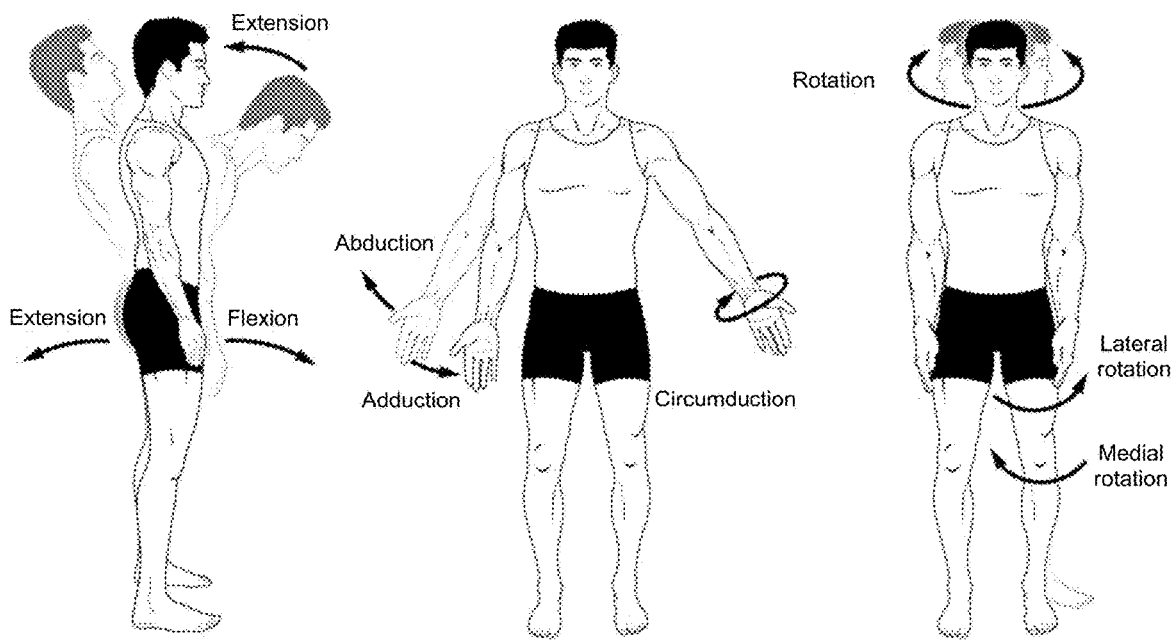
Figure 4B:
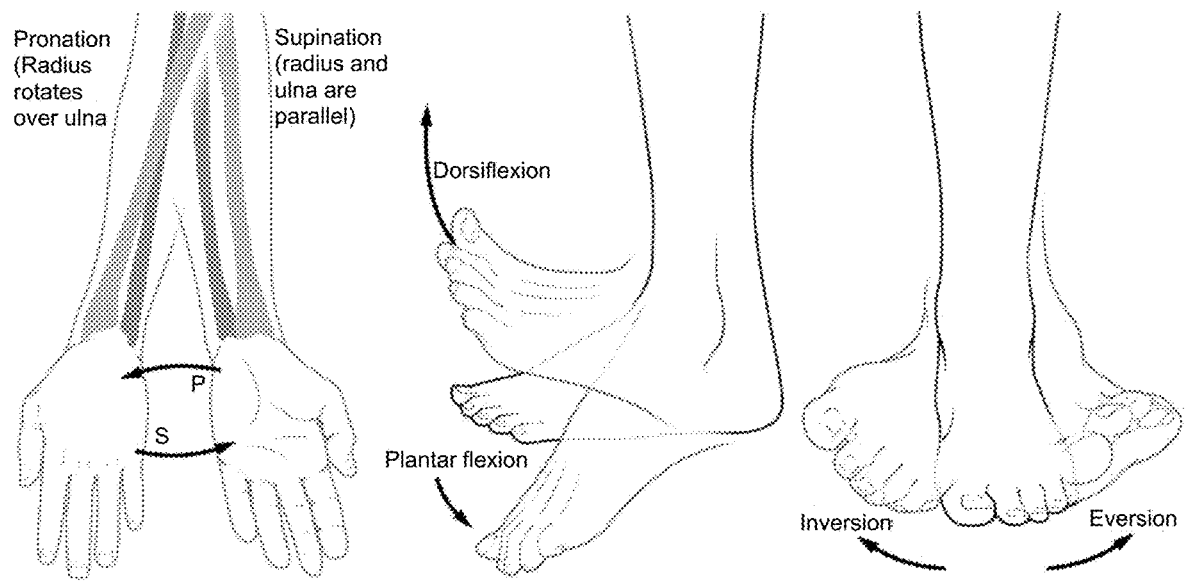
Figure 4B:
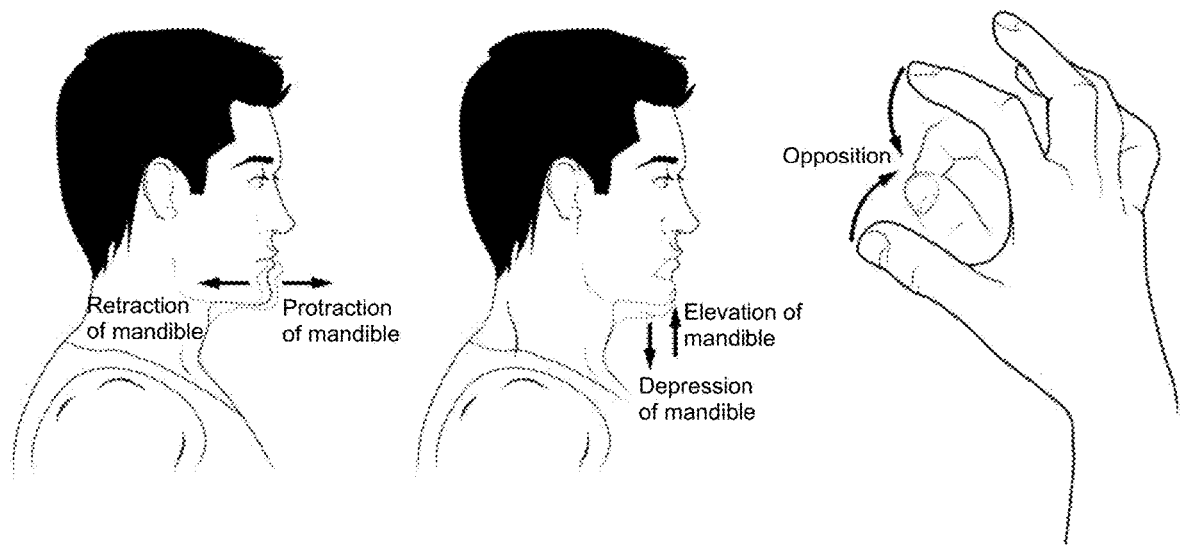

FIGS. 4A-B illustrate diagrams of muscle movements according to some embodiments. Human body parts bend at joints as shown such as the head bending at the neck, hands bending at the wrist, fingers bending at knuckles, legs bending at the knee, and feet bending at the ankle In some embodiments, all joint movements are able to be fit into 12 categories. In some embodiments, by classifying the joint movements into categories, the correct muscle deformation is able to be generated based on the classified movement. For example, when a character bends at the knee, specific muscles deform in the leg, and using machine learning, the correct muscles are able to be deformed at the appropriate time. The muscle movements are the types of movements the actor will perform including the range of motion. The muscle movements are targeted for capture. [FIGS. 4A-B, DeSaix, Peter, et al. "Anatomy & Physiology (OpenStax)." (2013). (Retrieved from https://openlibrary-repo.ecampusontario.ca/jspui/handle/123456789/331)]

Figure 5:
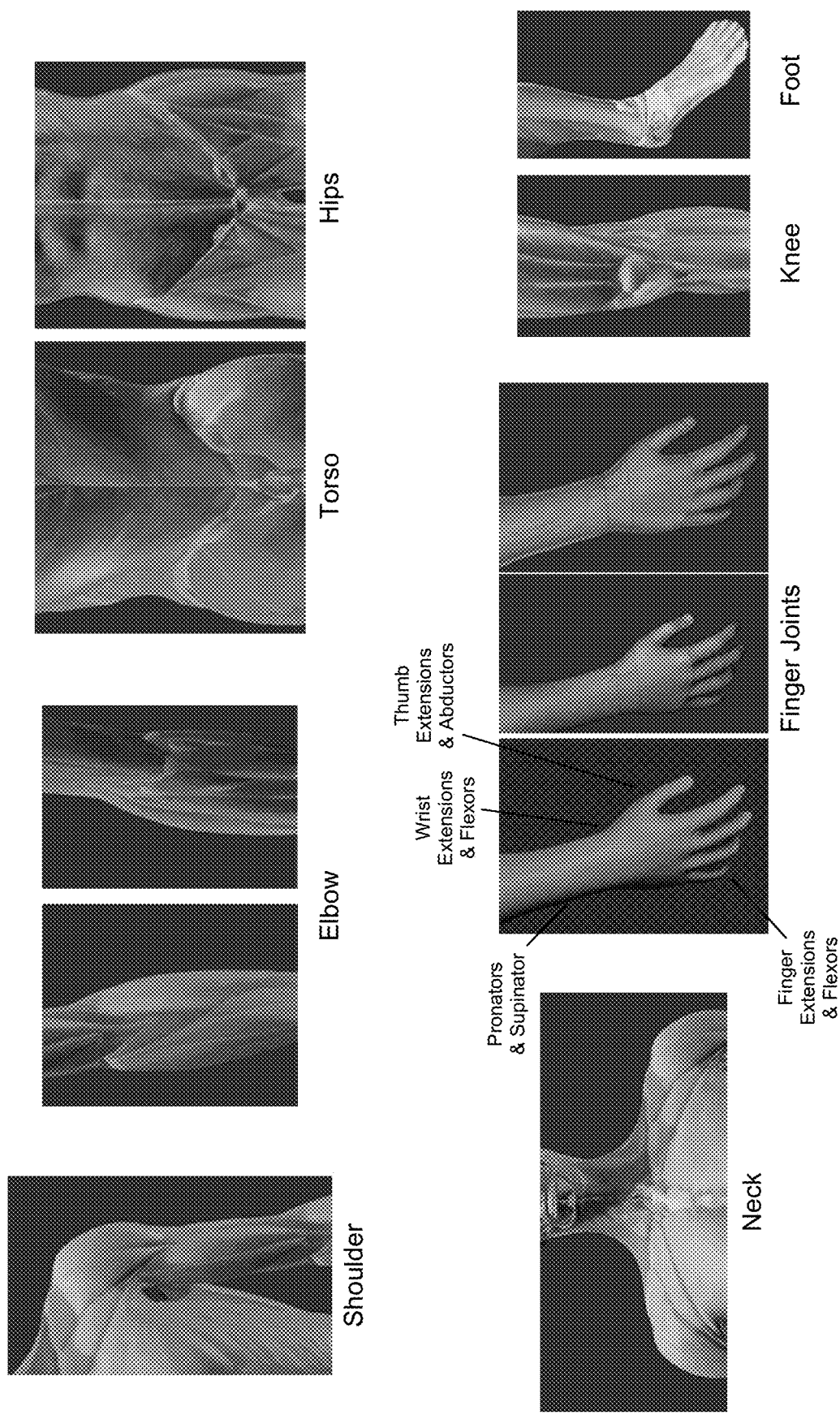
FIG. 5 illustrates examples of major muscle groups according to some embodiments.

FIG. 5 illustrates examples of major muscle groups according to some embodiments. The upper body and the lower body each have 4 joints (excluding finger/toe joints). The joints in the upper body include: the shoulder, elbow, neck and hands, and the joints in the lower body include: the torso, hips, knees and ankles Each of the joints have corresponding muscle groups. As described, these corresponding muscle groups deform when the character is in motion. The lower body and upper body muscles are the main targets for capture when an actor is moving.

Figure 6:
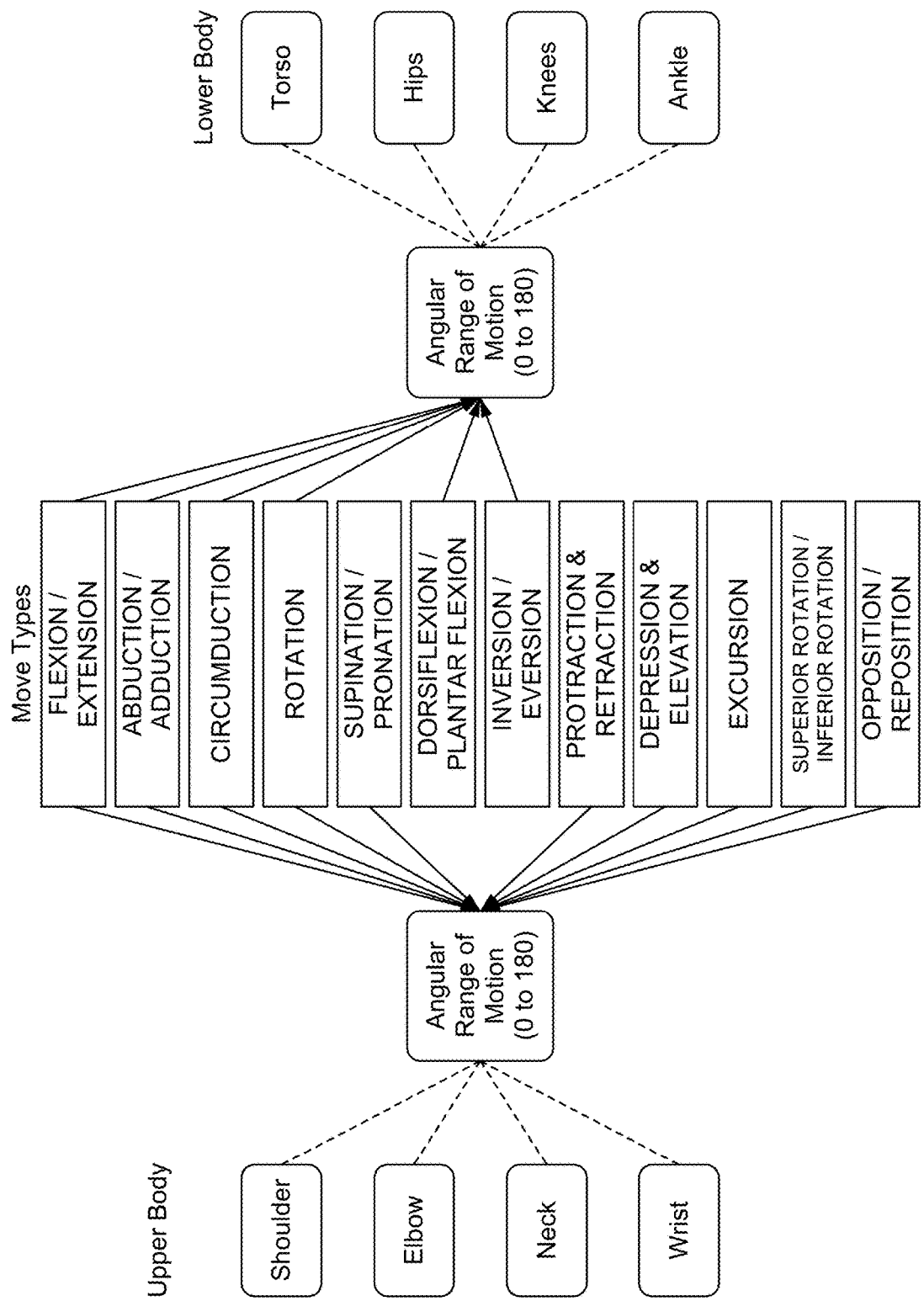
FIG. 6 illustrates a diagram of move types based on joints for mesh capture according to some embodiments.

FIG. 6 illustrates a diagram of move types based on joints for mesh capture according to some embodiments. There are many different move types with varying angular ranges of motion (0 to 180 degrees) for each of the main upper and lower joints. By including the various move types, the desired muscles are able to be captured and then later utilized when generating the mesh.

Figure 7:
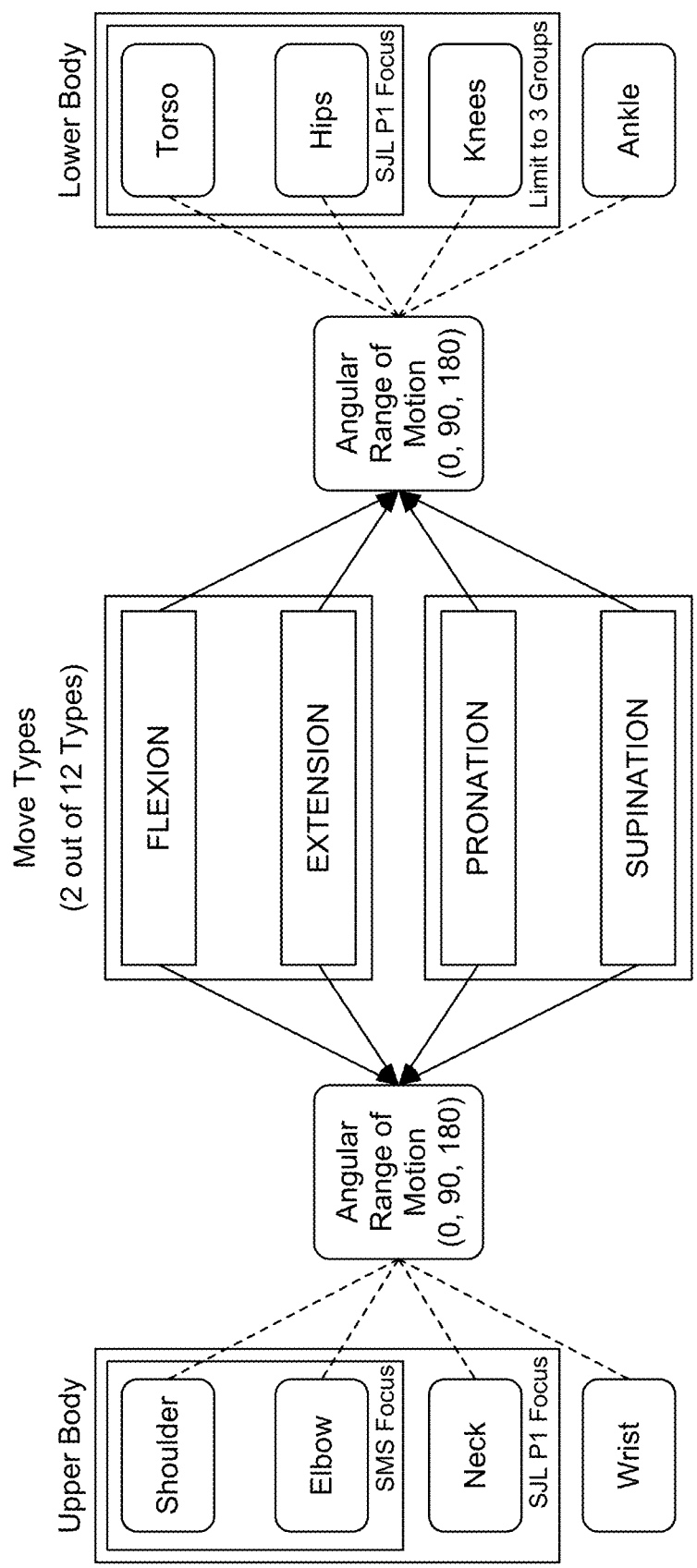
FIG. 7 illustrates a diagram of move types based on joints for mesh capture according to some embodiments.

FIG. 7 illustrates a diagram of move types based on joints for mesh capture according to some embodiments. Two of the 12 move types are shown (flexion/extension and pronation/supination). In some embodiments, the angular range of motion is selectable from 0, 90 and 180 degrees, and in some embodiments, finer tuning of the angular range of motion is possible to a specific number of degrees or even fractions of degrees.

Figure 8:
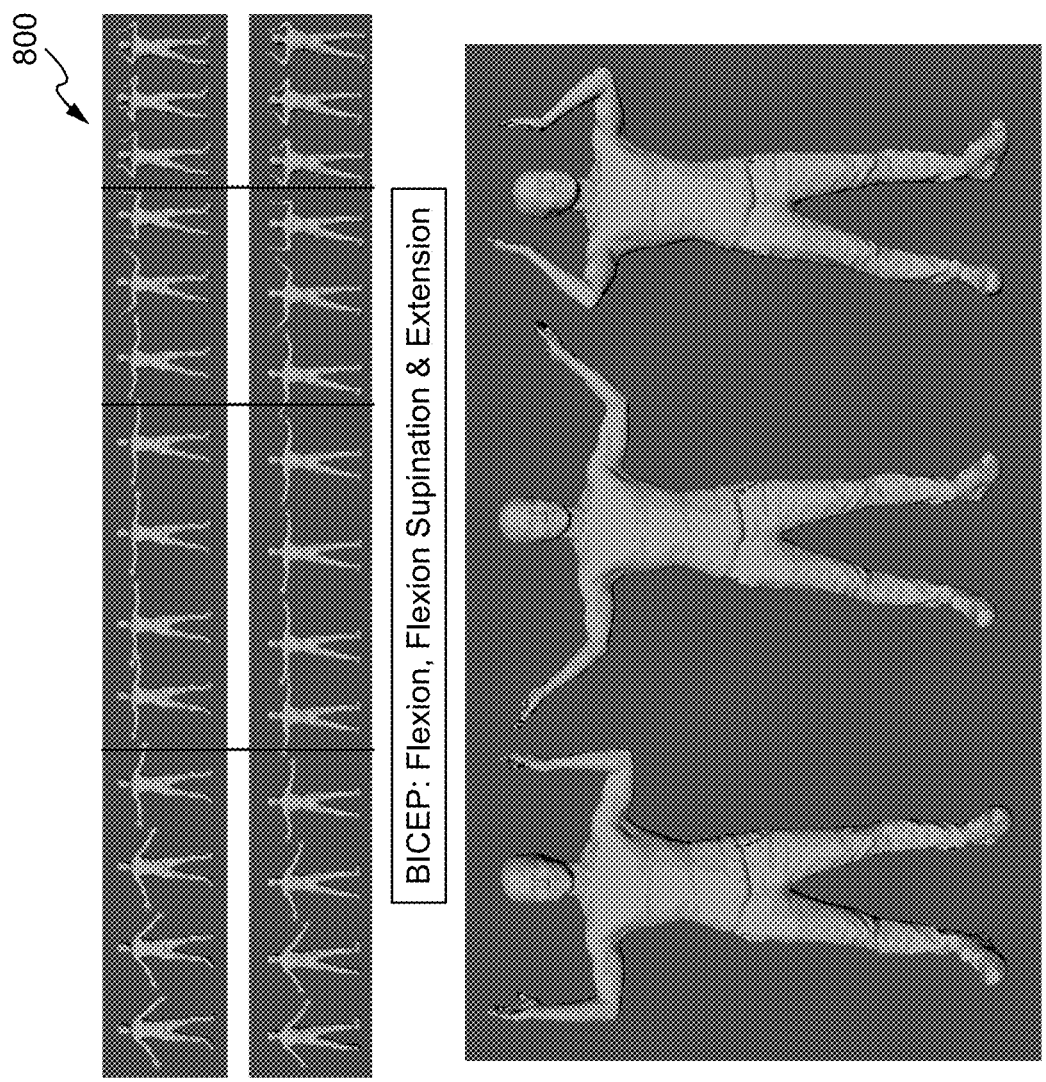
FIG. 8 illustrates examples of extreme poses according to some embodiments.
Figure 8:
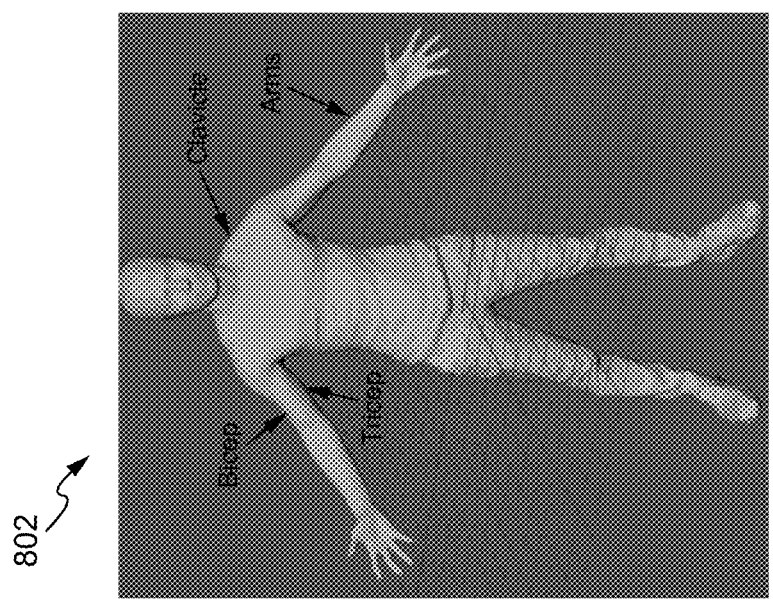

FIG. 8 illustrates examples of extreme poses according to some embodiments. Image 800 shows six movement types such as lifting arms up to the side, raising arms from down at the hips to over head and putting arms out front. Image 802 shows the four joints and the target muscles.

Figure 9:
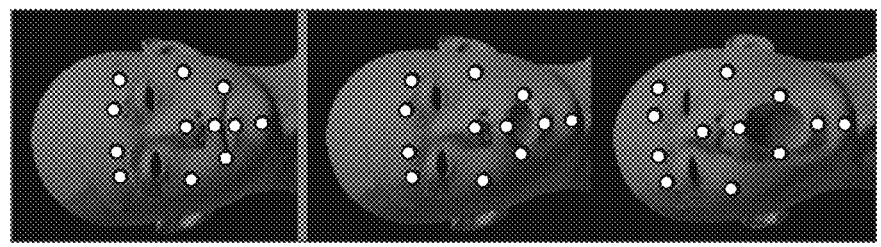
FIG. 9 illustrates a diagram of automatic blendshape extraction according to some embodiments.

FIG. 9 illustrates a diagram of automatic blendshape extraction according to some embodiments. Pose parameters 900 combined with facial action units 902 result in the 4D tracked meshes 904. An automatic blendshape extraction method uses 4D scans of a moving face which expedites the character making process and reduces the production cost. A 4D face scan method such as U.S. patent application Ser. No. 17/411,432, filed Aug. 25, 2021, titled, "PRESERVING GEOMETRY DETAILS IN A SEQUENCE OF TRACKED MESHES," which is hereby incorporated by reference in its entirety for all purposes, is able to be used. It provides high quality 4D tracked meshes of the moving face as shown in 904, and the pose parameters 900 also are able to be obtained from the tracked 4D meshes. The user may use control points or bones for the pose representation. [FIG. 9, center figure is from P. Ekman, Wallace V. Friesen, Joseph C. Hager, "Facial action coding system: A technique for the measurement of facial movement>>Psychology 1978, 2002. ISBN 0-931835-01-1 1.]

Facial action units are of interest. With 4D tracked meshes including a variety of different expressions available, a set of character-specific facial action units are able to be automatically generated. It can be regarded as a decomposition of 4D meshes into dynamic pose parameters and static action units, where only the action units are unknown. Machine learning techniques for the decomposition problem are able to be used.

Figure 10:
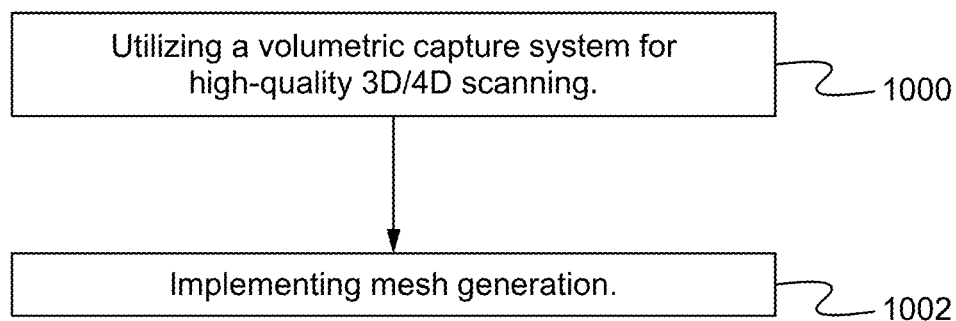
FIG. 10 illustrates a flowchart of implementing mesh generation according to some embodiments.

FIG. 10 illustrates a flowchart of implementing mesh generation according to some embodiments. In the step 1000, a volumetric capture system is utilized for high-quality 3D/4D scanning. As described in PCT Patent Application PCT/US2019/068151, the volumetric capture system is able to acquire photos and videos simultaneously for high-quality 3D/4D scanning. The high-quality 3D/4D scanning includes denser camera views for high-quality modeling. In some embodiments, instead of utilizing the volumetric capture system, another system for acquiring 3D content and time information is utilized. For example, at least two separate 3D scans are acquired. Furthering the example, the separate 3D scans are able to be captured and/or downloaded.

During the capture time, joint and muscle movement and deformation are acquired. For example, the specific muscles and the specific deformation of the muscles over time are captured. Specific joints and the corresponding muscles to the joints of the actor are able to be targeted during capture time. For example, the target subject/actor is able to be requested to move, and the muscles will deform. The deformation of the muscles is able to be captured statically and in motion. The information acquired from the movement and deformation is able to be used to train a system so that the system is able to use the joint and muscle information to perform any movement of the character. For a very complex situation, this is very difficult for an animator to do. Any complex muscle deformation is learned during the modeling stage. This enables synthesis in the animation stage.

In the step 1002, mesh generation is implemented. Once high quality information is captured for the scanning, mesh generation is implemented including extreme pose modeling and registration for blending. The 3D scan information is able to be used to generate auto high-fidelity extreme poses. For example, the frames between key frames are able to be properly generated using the 4D scan information which includes frame information between key frames. The high temporal resolution of the 4D scan information enables mesh tracking to auto register extreme pose meshes for blending. In another example, the 4D scan enables mesh generation of a muscle deforming over time. Similarly, with machine learning involving joint information as well as corresponding muscle and muscle deformation information, a mesh including muscle deformation information is able to be generated where the movement was not acquired by the capture system. For example, although an actor was requested to perform a standing vertical jump and to run for capture, the capture system did not acquire the actor performing a running jump. However, based on the acquired information of the standing vertical jump and running where the acquired information includes muscle deformation during those actions, and using the machine learning with the knowledge of joints and other physiological information, the mesh for the running jump including detailed muscle deformation is able to be generated. In some embodiments, mesh generation includes muscle estimation or projection based on the 3D scanning and 4D scanning and machine learning.

Major upper body and lower body joints are able to be identified that are important for generating deformation and capturing deformation using a wide range of motion for all movement types across all joint categories.

By using the volumetric capture system and mesh tracking, the topology changes are able to be tracked. Thus, each pose captured will have the same topology which makes blending between multiple poses easier and more accurate. The targeted joints and muscles are able to be utilized when generating the mesh.

In some embodiments, mesh generation includes generating a static mesh based on the 3D scan information, and the mesh is able to be modified/animated using the 4D scan information. For example, as the mesh moves in time, additional mesh information is able to be established/generated from the video content of the 4D scan information and/or machine learning information. As described, the transitions between each frame of the animated mesh are able to maintain topology, such that the mesh tracking and blending is smooth. In other words, topology correspondences are established across a 4D scanned mesh sequence for generating corrective shapes which will be used in shape interpolation and skeleton driven deformation.

In some embodiments, fewer or additional steps are implemented. In some embodiments, the order of the steps is modified.

Figure 11:
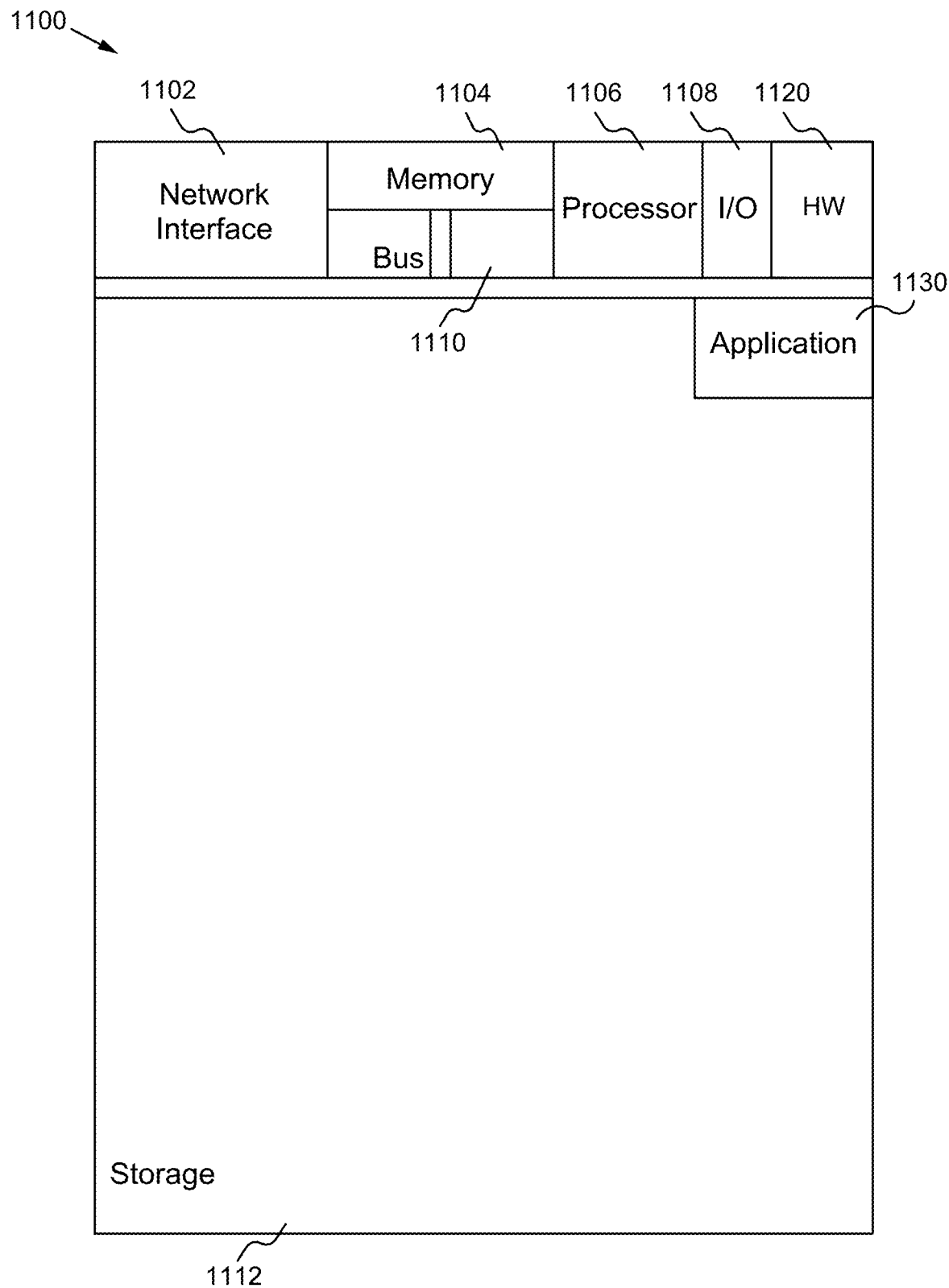
FIG. 11 illustrates a block diagram of an exemplary computing device configured to implement the automatic blending method according to some embodiments.

FIG. 11 illustrates a block diagram of an exemplary computing device configured to implement the automatic blending method according to some embodiments. The computing device 1100 is able to be used to acquire, store, compute, process, communicate and/or display information such as images and videos. The computing device 1100 is able to implement any of the automatic blending aspects. In general, a hardware structure suitable for implementing the computing device 1100 includes a network interface 1102, a memory 1104, a processor 1106, I/O device(s) 1108, a bus 1110 and a storage device 1112. The choice of processor is not critical as long as a suitable processor with sufficient speed is chosen. The memory 1104 is able to be any conventional computer memory known in the art. The storage device 1112 is able to include a hard drive, CDROM, CDRW, DVD, DVDRW, High Definition disc/drive, ultra-HD drive, flash memory card or any other storage device. The computing device 1100 is able to include one or more network interfaces 1102. An example of a network interface includes a network card connected to an Ethernet or other type of LAN. The I/O device(s) 1108 are able to include one or more of the following: keyboard, mouse, monitor, screen, printer, modem, touchscreen, button interface and other devices. Automatic blending application(s) 1130 used to implement the automatic blending method are likely to be stored in the storage device 1112 and memory 1104 and processed as applications are typically processed. More or fewer components shown in FIG. 11 are able to be included in the computing device 1100. In some embodiments, automatic blending hardware 1120 is included. Although the computing device 1100 in FIG. 11 includes applications 1130 and hardware 1120 for the automatic blending method, the automatic blending method is able to be implemented on a computing device in hardware, firmware, software or any combination thereof. For example, in some embodiments, the automatic blending applications 1130 are programmed in a memory and executed using a processor. In another example, in some embodiments, the automatic blending hardware 1120 is programmed hardware logic including gates specifically designed to implement the automatic blending method.

In some embodiments, the automatic blending application(s) 1130 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

To utilize the automatic blending method described herein, devices such as digital cameras/camcorders/computers are used to acquire content and then the same devices or one or more additional devices analyze the content. The automatic blending method is able to be implemented with user assistance or automatically without user involvement to perform automatic blending.

In operation, the automatic blending method provides a more accurate and efficient automatic blending and animation method. The automatic blending method utilizes a photo-video system which aids mesh-tracking for maintaining mesh registration (topology consistency) along with ease of extreme pose modeling unlike hand-crafted shape modeling which aids registration but has manual shape generation and the 3D scanning-based approach which aids shape generation but not registration. By using the photo-video system and mesh tracking, the topology changes are able to be tracked. Thus, each pose captured will have the same topology which makes blending between multiple poses easier and more accurate.

Some Embodiments of Automatic Blending of Human Facial Expression and Full-Body Poses for Dynamic Digital Human Model Creation Using Integrated Photo-Video Volumetric Capture System and Mesh-Tracking 1. A method programmed in a non-transitory of a device comprising:
    using a volumetric capture system configured for 3D scanning and 4D scanning including capturing photos and video simultaneously, wherein the 3D scanning and 4D scanning includes detecting muscle deformation of an actor; and
    implementing mesh generation based on the 3D scanning and 4D scanning
2. The method of clause 1 wherein the 3D scanning and 4D scanning include:
    3D scans to be used to generate automatic high-fidelity extreme poses and
    4D scans which include high temporal resolution which enables mesh tracking to automatically register extreme pose meshes for blending.
3. The method of clause 2 wherein generating automatic high-fidelity extreme poses includes using 3D scans of the actor and muscle deformation of the actor to generate the automatic high-fidelity extreme poses.
4. The method of clause 2 wherein 4D scanning and mesh-tracking are used to establish topology correspondences across a 4D scanned mesh sequence for generating corrective shapes for shape interpolation and skeleton driven deformation.
5. The method of clause 1 further comprising identifying and targeting joints and muscles of the actor by the volumetric capture system for 3D scanning and 4D scanning
6. The method of clause 1 wherein mesh generation includes muscle estimation or projection based on the 3D scanning and 4D scanning and machine learning.
7. The method of clause 1 wherein implementing mesh generation includes using the 3D scanning and 4D scanning to generate meshes in extreme poses including muscle deformation.
8. The method of clause 1 further comprising implementing mesh tracking for tracking topology changes to enable each pose captured to have a same topology for blending between poses.
9. An apparatus comprising:
    a non-transitory memory for storing an application, the application for:
        using a volumetric capture system configured for 3D scanning and 4D scanning including capturing photos and video simultaneously, wherein the 3D scanning and 4D scanning includes detecting muscle deformation of an actor; and
        implementing mesh generation based on the 3D scanning and 4D scanning; and
    a processor coupled to the memory, the processor configured for processing the application.
10. The apparatus of clause 9 wherein the 3D scanning and 4D scanning include:
    3D scans to be used to generate automatic high-fidelity extreme poses and
    4D scans which include high temporal resolution which enables mesh tracking to automatically register extreme pose meshes for blending.
11. The apparatus of clause 10 wherein generating automatic high-fidelity extreme poses includes using 3D scans of the actor and muscle deformation of the actor to generate the automatic high-fidelity extreme poses.
12. The apparatus of clause 10 wherein 4D scanning and mesh-tracking are used to establish topology correspondences across a 4D scanned mesh sequence for generating corrective shapes for shape interpolation and skeleton driven deformation.
13. The apparatus of clause 9 wherein the application is further configured for identifying and targeting joints and muscles of the actor by the volumetric capture system for 3D scanning and 4D scanning
14. The apparatus of clause 9 wherein mesh generation includes muscle estimation or projection based on the 3D scanning and 4D scanning and machine learning.
15. The apparatus of clause 9 wherein implementing mesh generation includes using the 3D scanning and 4D scanning to generate meshes in extreme poses including muscle deformation.
16. The apparatus of clause 9 wherein the application is further configured for implementing mesh tracking for tracking topology changes to enable each pose captured to have a same topology for blending between poses.
17. A system comprising:
    a volumetric capture system for 3D and 4D scanning including capturing photos and video simultaneously, wherein the 3D scanning and 4D scanning includes detecting muscle deformation of an actor; and
    a computing device configured for:
        receiving the captured photos and video from the volumetric capture system; and
        implementing mesh generation based on the 3D scanning and 4D scanning
18. The system of clause 17 wherein the 3D scanning and 4D scanning include:
    3D scans to be used to generate automatic high-fidelity extreme poses and
    4D scans which include high temporal resolution which enables mesh tracking to automatically register extreme pose meshes for blending.
19. The system of clause 18 wherein generating automatic high-fidelity extreme poses includes using 3D scans of the actor and muscle deformation of the actor to generate the automatic high-fidelity extreme poses.
20. The system of clause 18 wherein 4D scanning and mesh-tracking are used to establish topology correspondences across a 4D scanned mesh sequence for generating corrective shapes for shape interpolation and skeleton driven deformation.
21. The system of clause 17 wherein the volumetric capture system is further configured for identifying and targeting joints and muscles of the actor by the volumetric capture system for 3D scanning and 4D scanning 22. The system of clause 17 wherein mesh generation includes muscle estimation or projection based on the 3D scanning and 4D scanning and machine learning.
23. The system of clause 17 wherein implementing mesh generation includes using the 3D scanning and 4D scanning to generate meshes in extreme poses including muscle deformation.
24. The system of clause 17 wherein the volumetric capture system is further configured for implementing mesh tracking for tracking topology changes to enable each pose captured to have a same topology for blending between poses.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory of a device comprising:
    using a volumetric capture system configured for 3D scanning and 4D scanning including capturing photos and video simultaneously, wherein the 3D scanning and 4D scanning includes detecting muscle deformation of an actor; and
    implementing mesh generation based on the 3D scanning and 4D scanning,
    wherein the 3D scanning and 4D scanning include:
        3D scans to be used to generate automatic high-fidelity extreme poses and
        4D scans which include high temporal resolution which enables mesh tracking to automatically register extreme pose meshes for blending and mesh generation of a muscle deforming over time.
2. The method of claim 1 wherein generating automatic high-fidelity extreme poses includes using 3D scans of the actor and muscle deformation of the actor to generate the automatic high-fidelity extreme poses.
3. The method of claim 1 wherein 4D scanning and mesh-tracking are used to establish topology correspondences across a 4D scanned mesh sequence for generating corrective shapes for shape interpolation and skeleton driven deformation.
4. The method of claim 1 further comprising identifying and targeting joints and muscles of the actor by the volumetric capture system for 3D scanning and 4D scanning.
5. The method of claim 1 wherein mesh generation includes muscle estimation or projection based on the 3D scanning and 4D scanning and machine learning.
6. The method of claim 1 wherein implementing mesh generation includes using the 3D scanning and 4D scanning to generate meshes in extreme poses including muscle deformation.
7. The method of claim 1 further comprising implementing mesh tracking for tracking topology changes to enable each pose captured to have a same topology for blending between poses.
8. An apparatus comprising:
    a non-transitory memory for storing an application, the application for:
        using a volumetric capture system configured for 3D scanning and 4D scanning including capturing photos and video simultaneously, wherein the 3D scanning and 4D scanning includes detecting muscle deformation of an actor; and
        implementing mesh generation based on the 3D scanning and 4D scanning, wherein the 3D scanning and 4D scanning include:
            3D scans to be used to generate automatic high-fidelity extreme poses and
            4D scans which include high temporal resolution which enables mesh tracking to automatically register extreme pose meshes for blending and mesh generation of a muscle deforming over time; and
    a processor coupled to the memory, the processor configured for processing the application.
9. The apparatus of claim 8 wherein generating automatic high-fidelity extreme poses includes using 3D scans of the actor and muscle deformation of the actor to generate the automatic high-fidelity extreme poses.
10. The apparatus of claim 8 wherein 4D scanning and mesh-tracking are used to establish topology correspondences across a 4D scanned mesh sequence for generating corrective shapes for shape interpolation and skeleton driven deformation.
11. The apparatus of claim 8 wherein the application is further configured for identifying and targeting joints and muscles of the actor by the volumetric capture system for 3D scanning and 4D scanning.
12. The apparatus of claim 8 wherein mesh generation includes muscle estimation or projection based on the 3D scanning and 4D scanning and machine learning.
13. The apparatus of claim 8 wherein implementing mesh generation includes using the 3D scanning and 4D scanning to generate meshes in extreme poses including muscle deformation.
14. The apparatus of claim 8 wherein the application is further configured for implementing mesh tracking for tracking topology changes to enable each pose captured to have a same topology for blending between poses.
15. A system comprising:
    a volumetric capture system for 3D and 4D scanning including capturing photos and video simultaneously, wherein the 3D scanning and 4D scanning includes detecting muscle deformation of an actor; and
    a computing device configured for:
        receiving the captured photos and video from the volumetric capture system; and
        implementing mesh generation based on the 3D scanning and 4D scanning, wherein the 3D scanning and 4D scanning include:
            3D scans to be used to generate automatic high-fidelity extreme poses and
            4D scans which include high temporal resolution which enables mesh tracking to automatically register extreme pose meshes for blending and mesh generation of a muscle deforming over time.
16. The system of claim 15 wherein generating automatic high-fidelity extreme poses includes using 3D scans of the actor and muscle deformation of the actor to generate the automatic high-fidelity extreme poses.
17. The system of claim 15 wherein 4D scanning and mesh-tracking are used to establish topology correspondences across a 4D scanned mesh sequence for generating corrective shapes for shape interpolation and skeleton driven deformation.
18. The system of claim 15 wherein the volumetric capture system is further configured for identifying and targeting joints and muscles of the actor by the volumetric capture system for 3D scanning and 4D scanning.

19. The system of claim 15 wherein mesh generation includes muscle estimation or projection based on the 3D scanning and 4D scanning and machine learning.

20. The system of claim 15 wherein implementing mesh generation includes using the 3D scanning and 4D scanning to generate meshes in extreme poses including muscle deformation.

21. The system of claim 15 wherein the volumetric capture system is further configured for implementing mesh tracking for tracking topology changes to enable each pose captured to have a same topology for blending between poses.

* * * * *